United States Patent
Abusleme et al.

(10) Patent No.: US 6,569,946 B2
(45) Date of Patent: May 27, 2003

(54) THERMOPLASTIC FLUOROPOLYMERS

(75) Inventors: Julio A. Abusleme, Saronno (IT); Claudia Manzoni, Bologna (IT)

(73) Assignee: Ausimont SpA, Milan (IT)

( * ) Notice: Subject to any disclaimer, the term of this patent is extended or adjusted under 35 U.S.C. 154(b) by 0 days.

(21) Appl. No.: 09/781,210

(22) Filed: Feb. 13, 2001

(65) Prior Publication Data

US 2001/0027236 A1 Oct. 4, 2001

(30) Foreign Application Priority Data

Feb. 15, 2000 (IT) .......................... MI00A0248

(51) Int. Cl.⁷ .............................. C08F 8/00; C08L 27/12; C08L 33/14; C08L 47/00
(52) U.S. Cl. ..................... 525/192; 525/193; 525/194; 525/197; 525/198; 525/199; 525/213; 525/215; 525/221; 525/222; 525/233; 525/240
(58) Field of Search ................. 525/192, 193, 525/194, 197, 198, 199, 213, 214, 215, 221, 222, 233, 240

(56) References Cited

U.S. PATENT DOCUMENTS

| 4,513,129 A | 4/1985 | Nakagawa et al. |
|---|---|---|
| 4,789,717 A | 12/1988 | Giannetti et al. |
| 4,864,006 A | 9/1989 | Giannetti et al. |
| 5,021,516 A | 6/1991 | Wheland |
| 5,182,342 A | 1/1993 | Feiring et al. |
| 5,434,229 A | 7/1995 | Abusleme et al. |
| 5,453,477 A | 9/1995 | Oxenrider et al. |
| 5,498,680 A | 3/1996 | Abusleme et al. |
| 5,510,435 A | 4/1996 | Abusleme et al. |
| 5,569,728 A | 10/1996 | Abusleme et al. |
| 5,597,880 A | 1/1997 | Abusleme et al. |
| 5,688,838 A | 11/1997 | Abusleme et al. |
| 6,107,393 A * | 8/2000 | Abusleme et al. .......... 524/454 |
| 6,391,975 B1 * | 5/2002 | Abusleme et al. .......... 525/199 |

FOREIGN PATENT DOCUMENTS

| EP | 0 185 242 A2 | 6/1986 |
|---|---|---|
| EP | 0 186 215 A2 | 7/1986 |
| EP | 0 526 216 A2 | 2/1993 |
| EP | 0 650 982 B1 | 5/1995 |
| EP | 0 866 079 A2 | 9/1998 |
| EP | 0 964 010 A2 | 12/1999 |
| EP | 1 067 145 A1 | 1/2001 |
| EP | 1 067 146 A1 | 1/2001 |
| EP | 1 067 148 A1 | 1/2001 |

* cited by examiner

Primary Examiner—Nathan M. Nutter
(74) Attorney, Agent, or Firm—Arent Fox Kintner Plotkin & Kahn PLLC

(57) ABSTRACT

Polymer composition comprising (A) (co)polymers based on chlorotrifluoroethylene (PCTFE) and (B) copolymers based on ethylene/chlorotrifluoroethylene (ECTFE) and/or ethylene/tetrafluoroethylene (ETFE).

29 Claims, No Drawings

THERMOPLASTIC FLUOROPOLYMERS

The present invention relates to thermoplastic fluoropolymers having improved mechanical properties in combination with low permeability to gases and water vapour, optionally with improved processability.

Specifically the present invention relates to thermoplastic fluoropolymers formed by copolymers based on chlorotrifluoroethylene (PCTFE) and by copolymers based on ethylene/chlorotrifluoroethylene (ECTFE) and/or ethylene/tetrafluoroethylene (ETFE).

The polymers of the invention are to be used to obtain pipes, sheets, molded articles and above all films to be used for example in the packaging industry and more specifically in the food and pharmaceutical industry.

It is known in the prior art that PCTFE is a fluorinated resin having a good chemical resistance characterized by very good properties of impermeability to gases and vapours, more specifically to oxygen, nitrogen and water vapour. These PCTFE copolymers have however poor mechanical properties, typical of a brittle material, i.e. high values of elastic modulus and yield stress combined with poor stress and strain at break.

As known the PCTFE polymers having a high molecular weight show better mechanical properties than those having a low viscosity. However the processing of fluoropolymers (e.g. PCTFE) having a very high viscosity is extremely difficult for the obtainment of pipes, sheets, films and molded articles.

The need was therefore felt to have available fluoropolymers having a very good impermeability to gases and vapours combined with improved mechanical properties, i.e. higher values of stress and strain at break, preferably having good processability.

The Applicant has surprisingly and unexpectedly found fluoropolymers having the above mentioned properties.

An object of the preent invention is a polymer composition comprising: (A) (co)polymers based on chlorotrifluoroethylene (PCTFE) and (B) (co)polymers based on ethylene/chlorotrifluoroethylene (ECTFE) and/or ethylene/tetrafluoroethylene (ETFE), wherein the E:CTFE (or TFE) ratio by moles is between 1:3 and 3:1. Preferably the amount of the (co)polymer based on chlorotrifluoroethylene (PCTFE) in the polymer composition is at least 5% by weight, more preferably at least 20% by weight, still more preferably at least 40% by weight.

The PCTFE (co)polymers according to the present invention contain at least 99% by moles of chlorotrifluoroethylene (CTFE) being the complement to 100 one or more fluorinated or non-fluorinated monomers. Among fluorinated monomers, (per)fluoropropylvinylether and (per)fluorodioxoles, as described in European patent applications EP 1.067,145 and EP 1,067,148, can for example be mentioned. Among non-fluorinated monomers, acrylic monomers as described in EP-A-964010 can for example be mentioned. Preferably PCTFE is the CTFE homopolymer (as described in European patent application EP 1,067,146). The PCTFE homopolymer having a Melt Flow Index (MFI) lower than 10.0 g/10' measured at 265° C. and at 10 Kg load according to the ASTM D 1238-88 method is still more preferred.

The (co)polymers (B) ECTFE or ETFE according to the present invention are preferably formed by:
(a) from 35 to 65%, preferably from 45 to 55%, more preferably from 48 to 52% by moles of ethylene (E),
(b) from 65 to 35%, preferably from 55 to 45%, more preferably from 52 to 48% by moles of chlorotrifluoroethylene (CTFE) (for the ECTFE copolymers) or tetrafluoroethylene (TFE) (for the ETFE copolymers), and optionally
(c) from 0.1 to 30%, by moles, preferably 0.1–10, more preferably 0.1–5 based on the total amount of monomers (a) and (b), of one or more fluorinated or non-fluorinated monomers. Among fluorinated monomers we can for example mention (per)fluoroalkylvinylethers (perfluoropropylvinylether), (per)fluorodioxoles as described in U.S. Pat. No. 5,597,880), vinylidenefluoride (VDF). Among non-fluorinated monomers, the hydrogenated monomers having the general formula:

$$CH_2=CH-(CH_2)_n-R_1 \qquad (I)$$

can be mentioned, wherein $R_1=OR_2$, or $-(O)_tCO(O)_pR_2$ wherein t and p are integers equal to 0, 1 and $R_2$ is a hydrogenated radical $C_1–C_{20}$ from 1 to 20 carbon atoms, of alkyl type, linear or branched when possible, or cycloalkyl, optionally containing heteroatoms and/or chlorine atoms, the heteroatoms preferably being O or N, $R_2$ optionally contains one or more functional groups, preferably selected from OH, COOH, epoxide, ester and ether, $R_2$ optionally contains double bonds, or $R_2$ is H, n is an integer in the range 0–10.

Preferably $R_2$ is of alkyl type from 1 to 10 carbon atoms containing functional groups of hydroxide type, n is an integer in the range 0–5.

The preferred comonomers (c) are for example selected from the following classes:
1) Acrylic monomers having the general formula:

$$CH_2=CH-CO-O-R_2$$

wherein $R_2$ has the above mentioned meaning.
Ethylacrylate, n-butylacrylate, acrylic acid, hydroxyethylacrylate, hydroxypropylacrylate, (hydroxy)ethylhexylacrylate, etc. can for example be mentioned.
2) Vinylether monomers having the general formula:

$$CH_2=CH-O-R_2$$

wherein $R_2$ has the above mentioned meaning.
Propylvinylether, cyclohexylvinylether, vinyl-4-hydroxybutylether, etc. can for example be mentioned.
3) Vinyl monomers of the carboxylic acid having the general formula:

$$CH_2=CH-O-CO-R_2$$

wherein $R_2$ has the above mentioned meaning.
Vinyl-acetate, vinylpropionate, vinyl-2-ethylhexanoate, etc. can for example be mentioned.
4) Unsaturated carboxylic acids having the general formula:

$$CH_2=CH-(CH_2)_n-COOH$$

wherein n has the above mentioned meaning. For example vinylacetic acid, etc.

The preferred (co)polymers of component (B) of the polymer composition of the invention are based on ethylene/chlorotrifluoroethylene (ECTFE) (co)polymers.

It has been found by the Applicant that to obtain also a good processability in combination with the other above mentioned properties of the polymer composition, the component (B) is an ECTFE having a Melt Flow Index (MFI) higher than 5 g/10', preferably higher than 10 g/10' measured at 275° C. and at 2.16 Kg load (according to the ASTM 3275-89 method).

Another object is a process for the preparation of the polymer composition according to the present invention based on PCTFE and ECTFE or ETFE. For example a preferable process is the radical synthesis of the ECTFE or ETFE (co)polymer (B) in the presence of the PCTFE (co)polymer (A), or the radical synthesis of the PCTFE (co) polymer (A) in the presence of the ECTFE or ETFE (co) polymer (B). These syntheses, (co)polymerizations, are carried out in the presence of radical initiators, in suspension in organic medium or in aqueous emulsion, at a temperature between −60° and 150° C., preferably −20° and 100° C., more preferably −10° and 50° C., and at a reaction pressure in the range 0.5–100 bar, preferably 5–40 bar.

Among the radical initiators that can be in particular used are:

(i) bis-acylperoxides of formula $(R_f—CO—O)_2$, wherein $R_f$ is a (per)haloalkyl $C_1$–$C_{10}$ (see for example EP 185,242 and U.S. Pat. No. 4,513,129), or a perfluoropolyoxyalkylene group (see for example EP 186,215 and U.S. Pat. No. 5,021,516); among them, bis-trichloroacetylperoxide and bis-dichlorofluoroacetylperoxide (see U.S. Pat. No. 5,569,728) are particularly preferred;

(ii) dialkylperoxides of formula $(R_H—O)_2$, wherein RH is an alkyl $C_1$–$C_{10}$; diterbutylperoxide (DTBP) is particularly preferred;

(iii) inorganic peroxides soluble in water, such as ammonium or alkaline metal persulphates or perphosphates; sodium and potassium persulphates are particularly preferred;

(iv) dialkylperoxydicarbonates, wherein the alkyl has from 1 to 8 carbon atoms, such as for example di-n-propyl-peroxydicarbonate and di-isopropyl-peroxydicarbonate (see EP 526,216);

(v) organic or inorganic redox systems, such as ammonium persulphate/sodium sulphite, hydrogen peroxide/aminoiminomethansulphinic acid, terbutylhydroperoxide/methabisulphite (see U.S. Pat. No. 5,453,477).

(vi) photoinitiators activated by UV radiation such as inorganic and organic peroxides, halogenated and polyhalogenated organic compounds (see EP 650,982, U.S. Pat. No. 5,688,838).

In the case of the copolymerization in suspension, the reaction medium is formed by an organic phase, to which water is added in order to favour the heat dispersion developed during the reaction. The organic phase can be formed by the monomers themselves, without addition of solvents, or by the monomers dissolved in a suitable organic solvent. Among solvents we can mention branched chain hydrocarbons described in U.S. Pat. No. 5,434,229, having from 6 to 25 carbon atoms and a ratio between methyl groups and number of carbon atoms higher than 0.5, such as for example 2,3-dimethylbutane, 2,3-dimethylpentane, 2,2,4-trimethylpentane, 2,2,4,6,6-pentamethylheptane, 2,2,4,4,6-pentamethylheptane, etc, or mixtures thereof. Other organic solvents are chlorofluorocarbons, such as $CCl_2F_2$ (CFC-12), $CCl_3F$ (CFC-11), $CCl_2FCClF_2$ (CFC-113), $CClF_2CClF_2$ (CFC-114), etc. Since said products have a destroying effect on the ozone present in the stratosphere, alternative products, such as the compounds containing only carbon, fluorine, hydrogen, and optionally oxygen, described in U.S. Pat. No. 5,182,342, have recently been suggested.

In particular (per)fluoropolyethers with at least one hydrogenated end group, preferably two, of the —$CF_2H$, —$CF_2CF_2H$, —$CF(CF_3)H$ type can be used.

In the case of the copolymerization in aqueous emulsion it is carried out in the presence of one or more fluorinated surfactants.

The most commonly used fluorinated surfactants are those of general formula:

wherein $R_f$ is a (per) fluoroalkyl chain $C_5$–$C_{16}$ or a (per) fluoropolyoxyalkylene chain, $X^-$ is —$COO^-$ or —$SO_3^-$, $M^+$ is selected from: $H^+$, $NH_4^+$, an alkaline metal ion. Among them we mention: ammonium and/or sodium perfluorooctanoate, (per)fluoropolyoxyalkylenes ended with one or more carboxylic groups, etc.

The process object of the present invention can be advantageously carried out in the presence of dispersions, emulsions or microemulsions preferably of perfluoropolyoxyalkylenes, according to U.S. Pat. No. 4,789,717 and U.S. Pat. No. 4,864,006, or also of microemulsions preferably of fluoropolyoxyalkylenes having hydrogenated end groups and/or hydrogenated repeating units, according to U.S. Pat. No. 5,498,680 in the name of the Applicant.

In the case of the copolymerization of ECTFE or ETFE in the presence of PCTFE (co)polymers, the molecular weight control of the ECTFE or ETFE (co)polymer can be made by using specific chain transfer agents. Among these it can be mentioned: ketones, esters, ethers or aliphatic alcohols having from 3 to 10 carbon atomns; hydrocarbons or halogenated hydrocarbons, having from 1 to 6 carbon atoms; bis(alkyl)carbonates wherein the alkyl has from 1 to 5 carbon atoms, etc. Among them chloroform and alkyl substituted cyclopentanes (see U.S. Pat. No. 5,510,435), in particular methylcyclopentane, are particularly preferred. The transfer agent is fed to the reactor at the beginning of the reaction, or in a continuous way or in discrete amounts during the polymerization. The amount of the used chain transfer agent can range within rather wide limits, depending on the type of the monomers, the reaction temperature and the molecular weight requested.

Generally, said amount ranges between 0.01 and 30% by weight, preferably between 0.05 and 10% by weight, based on the total amount of monomers fed into the reactor.

The preferred process for the preparation of the polymer composition of the invention based on PCTFE and ECTFE or ETFE is characterized in that both (co)polymers, first PCTFE and then ECTFE or ETFE, or viceversa, are synthetized in sequence in the same reaction medium, both in suspension or in emulsion, or the PCTFE and ECTFE or ETFE (co) polymer is added under the form of powder or latex in the reaction medium before and/or during the radical synthesis.

The preferred process according to the present invention is the one in which the ECTFE or ETFE copolymer is synthetized in the presence of the PCTFE (co)polymer.

Besides it has been found by the Applicant that, in the specific case of the ECTFE or ETFE copolymer (B) synthesis in organic suspension in presence of water and of a PCTFE (co)polymer (A), the polymer composition of the invention is obtained without polymer build-up in the reactor, even when the component (B) has a low cristallinity.

Said PCTFE can be added under the form of powder or latex which coagulates by adding a coagulant in the reaction medium in the presence of the organic and aqueous phase. The coagulants of PCTFE are those known in the coagulation of the fluoropolymer latexes, for example aluminum sulphate, nitric acid, hydrochloric acid, calcium chloride. Calcium chloride is preferred. The amount of the coagulants depends on the type of the used coagulant. Amounts in the range 0.001%–30% by weight with respect to the total amount of water in the reaction medium, preferably in the range 0.01%–5% by weight, can be used.

The PCTFE addition under the form of latex at the beginning and/or during the (co)polymer (B) synthesis is preferred.

The PCTFE latex can be obtained by (co)polymerization in aqueous emulsion in the presence of a suitable surfactant as above mentioned.

The viscosity measurement of the polymers object of the present invention is made by the Melt Flow Index (MFI) at 265° C. and at 10 Kg load according to the ASTM D1238-88 method.

The percentage by weight of the PCTFE (co)polymer in the polymer composition is determined by mass balance.

The mechanical properties at 23° C., have been obtained according to the ASTM D1708 method by using compression molded test specimens.

The permeability to oxygen has been determined according to the ASTM D1434 method at room temperature (23.5±0.2° C.) by using compression molded sheets having a nominal thickness of 0.3 mm.

Some embodiment Examples of the present invention are hereinafter reported, the purpose of which is merely illustrative but not limitative of the scope of the invention itself.

EXAMPLE 1

Reference

In an enamelled autoclave equipped with enamelled baffles and stirrer working at 300 rpm it has been introduced in sequence:
8.2 l of demineralized $H_2O$;
90 g of a microemulsion formed by: 20% by weight of Galden® D02, of formula:

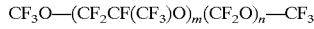

$$CF_3O—(CF_2CF(CF_3)O)_m(CF_2O)_n—CF_3$$

having m/n=20 and average molecular weight 450; 40% by weight of a surfactant of formula:

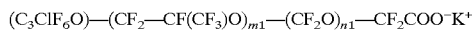

$$(C_3ClF_6O)—(CF_2—CF(CF_3)O)_{m1}—(CF_2O)_{n1}—CF_2COO^-K^+$$

having m1/n1=82.7 and average molecular weight 527; the remaining part being formed by $H_2O$;
19.0 g of potassium persulphate dissolved in 800 g of demineralized $H_2O$.

Then 100 g of 2,2,4-trifluoro-5-trifluoromethoxy-1,3-dioxole (TTD) and 4 Kg of CTFE between 1° C. and 5° C. were introduced in the autoclave. Then the autoclave was heated to the reaction temperature of 50° C. After 12.5 hours of reaction the autoclave was vented and discharged at room temperature. The latex produced was diluted in water obtaining the concentration of 217.2 g of polymer per Kg of latex.

Some properties of the obtained PCTFE copolymer are reported in Table 1. The monomeric composition of the PCTFE copolymer containing 0.3% by moles of TTD was obtained by the $F^{19}NMR$ and FT-IR analyses.

EXAMPLE 1

In an enamelled autoclave equipped with enamelled baffles and stirrer working at 450 rpm, 3.4 l of demineralized water, 4.6 Kg of PCTFE copolymer latex, obtained according to Example 1 (reference), 14 ml of chloroform, 320 g of perfluoropropylvinylether (FPVE) and 2.0 Kg of chlorotrifluoroethylene (CTFE) were introduced. Then the latex was coagulated under stirring by feeding 350 ml of an aqueous $CaCl_2$ solution at 10% by weight. The reaction temperature was set and maintained at 5° C. Then ethylene was fed up to a pressure of 11.35 absolute bar. In the autoclave the radical initiator was then continuously fed during the whole ECTFE (co)polymer synthesis under the form of a solution, maintained at −17° C., of trichloroacetylperoxide (TCAP) in isooctane with titre of 0.12 g TCAP/ml. These operating conditions are such as to obtain an ECTFE (co)polymer having a Melt Flow Index (MFI) higher than 5 g/10' measured at 275° C. and at 2.16 Kg load (according to the ASTM 3275-89 method).

The pressure was kept constant for the whole polymerization by continuously feeding ethylene into the reactor up to a consumption of 193 g; the total amount of initiator solution was 48 ml. The polymerization lasted 197 minutes. The product was dried at 120° C. for about 16 hours. The amount of dry product obtained was 2353 g.

Some properties of the obtained polymer composition are reported in Table 1.

EXAMPLE 2

In an enamelled autoclave equipped with enamelled baffles and stirrer working at 450 rpm, 6.0 l of demineralized water, 470 g of powder obtained by cryogenic coagulation and subsequent drying of the PCTFE latex of Example 1 (reference), 13 ml of chloroform and 3.0 Kg of chlorotrifluoroethylene (CTFE) were introduced. The reaction temperature was set and maintained at 5° C. Then ethylene was fed up to a pressure of 11.2 absolute bar. In the autoclave the radical initiator was then continuously fed during the whole ECTFE (co)polymer synthesis, under the form of a solution, maintained at −17° C., of trichloroacetylperoxide (TCAP) in CFC-113 with titre of 0.15 g TCAP/ml.

The pressure was kept constant for the whole polymerization by continuously feeding ethylene to the reactor up to a consumption of 135 g; the total amount of initiator solution was 17 ml. The polymerization lasted 277 minutes.

The product was dried at 120° C. for about 16 hours. The amount of dry product obtained was 1660 g.

Some properties of the obtained fluoropolymer are reported in Table 1.

EXAMPLE 3

In an enamelled autoclave equipped with enamelled baffles and stirrer working at 450 rpm, 6.0 l of demineralized water, 940 g of powder obtained by cryogenic coagulation and subsequent drying of the PCTFE latex of Example 1 (reference), 30 ml of chloroform and 3.0 Kg of chlorotrifluoroethylene (CTFE) were introduced. The reaction temperature was set and maintained at 5° C. Then ethylene was fed up to a pressure of 11.2 absolute bar. In the autoclave the radical initiator was then continuously fed during the whole ECTFE (co)polymer synthesis, under the form of a solution, maintained at −17° C., of trichloroacetylperoxide (TCAP) in CFC-113 with titre of 0.13 g TCAP/ml. These operating conditions are such as to obtain an ECTFE (co)polymer having a Melt Flow Index (MFI) higher than 5 g/10' measured at 275° C. and at 2.16 Kg load (according to the ASTM 3275-89 method).

The pressure was kept constant for the whole polymerization by continuously feeding ethylene into the reactor up to a consumption of 70 g; the total amount of initiator solution was 11 ml. The polymerization lasted 159 minutes. The product was dried at 120° C. for about 16 hours. The amount of dry product obtained was 1588 g.

Some properties of the obtained fluoropolymer are reported in Table 1.

In Table 1 from the comparison of Example 3 with Example 1 (reference) it can be observed that with comparable permeability and mechanical properties values, the viscosity of the product of Example 3 is much lower than that of the product of Example 1 (reference). This implies the obtainment of a product having good mechanical and permeability properties combined with a good processability.

EXAMPLE 2

Reference

In an enamelled autoclave equipped with enamelled baffles and stirrer working at 450 rpm, 5.0 l of demineralized water, 8.0 Kg of chlorotrifluoroethylene (CTFE) were introduced. The reaction temperature was set and maintained at 20° C. corresponding to an initial pressure of 6 absolute bar. In the autoclave the radical initiator was then continuously fed with a flow-rate of 10 ml/h during the whole polymerization (7 hours), under the form of a solution, maintained at −17° C., of trichloroacetylperoxide (TCAP) in CFC-113, with titre of 0.11 g TCAP/ml. The product was dried at 175° C. for about 16 hours. The amount of dry product obtained was 548 g.

Some properties of the obtained PCTFE are reported in Table 2.

EXAMPLE 4

In an enamelled autoclave equipped with enamelled baffles and stirrer working at 450 rpm, 5.0 l of demineralized water, 8.0 Kg of chlorotrifluoroethylene (CTFE) were introduced. The reaction temperature was set and maintained at 20° C. corresponding to an initial pressure of 6 absolute bar. In the autoclave the radical initiator was then continuously fed with a flow-rate of 10 ml/h during the whole PCTFE polymerization (14 hours), under the form of a solution, maintained at −17° C., of trichloroacetylperoxide (TCAP) in CFC-113, with titre of 0.12 g TCAP/ml. At the end of this first polymerization the autoclave was heated up to 30° C. and kept for 30 minutes.

Subsequently the reaction temperature was set and maintained at 5° C. and 1.5 kg of methanol and 30 ml of chloroform were introduced. Then ethylene was fed up to a pressure of 11.2 absolute bar. In the autoclave the radical initiator was then continuously fed for the whole ECTFE (co)polymer synthesis, under the form of a solution, maintained at −17° C., of trichloroacetylperoxide (TCAP) in CFC-113, with titre of 0.14 g TCAP/ml.

The pressure was kept constant for the whole polymerization by continuously feeding ethylene into the reactor up to a consumption of 137 g; the total amount of initiator solution was 66 ml. The ECTFE polymerization lasted 945 minutes. The product was dried at 120° C. for about 16 hours. The amount of dry product obtained was 2587 g.

Some properties of the obtained polymer composition are reported in Table 2.

EXAMPLE 5

In an enamelled autoclave equipped with enamelled baffles and stirrer working at 450 rpm, 5.0 l of demineralized water, 8.0 Kg of chlorotrifluoroethylene (CTFE) were introduced. The reaction temperature was set and maintained at 20° C. corresponding to an initial pressure of 6 absolute bar. In the autoclave the radical initiator was then continuously fed with a flow-rate of 9 ml/h for the whole PCTFE polymerization (7 hours), under the form of a solution, maintained at −17° C., of trichloroacetylperoxide (TCAP) in CFC-113, with titre of 0.14 g TCAP/ml. At the end of this first polymerization the autoclave was heated up to 30° C. and kept for 30 minutes.

Subsequently the reaction temperature was set and maintained at 5° C. and 1.5 kg of methanol and 30 ml of chloroform were introduced. Then ethylene was fed up to a pressure of 11.2 absolute bar. In the autoclave the radical initiator was then continuously fed for the whole ECTFE (co)polymer synthesis, under the form of a solution, maintained at −17° C., of trichloroacetylperoxide (TCAP) in CFC-113, with a titre of 0.14 g TCAP/ml.

The pressure was kept constant for the whole polymerization by continuously feeding ethylene to the reactor up to a consumption of 135 g; the total amount of initiator solution was 14 ml. The ECTFE polymerization lasted 282 minutes. The product was dried at 175° C. for about 16 hours. The amount of dry product obtained was 2187 g.

Some properties of the obtained polymer composition are reported in Table 2.

TABLE 1

| Examples | 1 | 2 | 3 | reference 1 |
|---|---|---|---|---|
| PCTFE % by weight | 42 | 28 | 59 | — |
| MFI (265° C./10 Kg) g/10' | 24 | 5.9 | 32 | 5.0 |
| Mechanical properties at 23° C. | | | | |
| Elastic modulus (MPa) | 1,452 | 1,335 | 1,251 | 1,317 |
| Yield stress (MPa) | 34.5 | 32.0 | 33.0 | 41.0 |
| Stress at break (MPa) | 42.0 | 56.2 | 40.0 | 39.0 |
| Elongation at break (%) | 169 | 206 | 165 | 160 |
| $O_2$ permeability (cc * mm/m$^2$ * 24 h * atm) | 10.6 | 9.5 | 7.0 | 4.5 |

TABLE 2

| Examples | 4 | 5 | reference 2 |
|---|---|---|---|
| PCTFE % by weight | 48 | 29 | — |
| MFI (265° C./10 Kg) g/10' | 3.6 | 6.5 | 1.4 |
| Mechanical properties at 23° C. | | | |
| Elastic modulus (MPa) | 1,338 | 1,565 | 1,248 |
| Yield stress (MPa) | 36.0 | 34.4 | 42.4 |
| Stress at break (MPa) | 46.7 | 45.0 | 42.5 |
| Elongation at break (%) | 169 | 170 | 125 |
| $O_2$ permeability (cc * mm/m$^2$ * 24 h * atm) | 5.7 | 9.6 | 2.3 |

What is claimed is:

1. A polymer composition comprising: (A) (co)polymers based on chlorotrifluoroethylefle (PCTFE) containing at least 99% by moles of chiorotrifluoroethylefle (CTFE), the complement to 100 being one or more fluorinated or acrylic monomers and; (B) (co)polymers based on ethylene/chlorotrifluoroethylene (ECTFE) and/or ethylene/tetrafluoroethylene (ETFE) wherein the E:CTFE (or TFE) ratio by moles is between 1:3 and 3:1.

2. A composition according to claim 1, characterized in that the amount of the (co)polymer (A) based on chlorotrifluoroethylene (PCTFE) is at least 5% by weight.

3. A composition according to claim 2, characterized in that the amount of the (co)polymer (A) based on chlorotrifluoroethylene (PCTFE) is at least 20% by weight.

4. A composition according to claim 3, characterized in that the amount of the (co)polymer (A) based on chlorotrifluoroethylene (PCTFE) is at least 40% by weight.

5. A composition according to claim 1, wherein fluorinated monomers are selected from (per)fluoropropylvinylether and (per)fluorodioxoles and vinylidenfluoride.

6. A composition according to claim 1, wherein non-fluorinated monomers are acrylic monomers.

7. A composition according to claim 1, wherein the PCTFE (co)polymer is the chlorotrifluoroethylene (CTFE) homopolymer.

8. A composition according to claim 7, wherein the PCTFE homopolymer is a homopolymer having a Melt Flow Index (MFI) lower than 10.0 g/10' measured at 265° C. and at 10 Kg load according to the ASTM D 1238-88 method.

9. A composition according to claim 1, characterized in that the ECTFE or ETFE (co)polymers (B) are formed by:
(a) from 35 to 65%, by moles of ethylene (E),
(b) from 65 35%, by moles of chiorotrifluoroethylene (CTFE) (for the ECTFE (co)polymers) or tetrafluoroethylene (TFE) (for the ETFE (co)polymers), and optionally
(c) from 0.1 to 30%, by moles, based on the total amount of monomers (a) and (b), of one or more fluorinated or non-fluorinated monomers.

10. A composition according to claim 9, wherein the fluorinated monomers (c) are selected between (per)fluoroalkylvinylethers and (per)fluorodioxoles.

11. A composition according to claim 9, wherein the non-fluorinated monomers (c) are the hydrogenated monomers having the general formula

$$CH_2=CH-(CH_2)_n-R_1 \qquad (I)$$

wherein $R_1=-OR_2$, or $-(O)_tCO(O)_n-R_2$ wherein t and p are integers equal to 0.1 and $R_2$ is a hydrogenated alkyl radical $C_1-C_{20}$ from 1 to 20 C atoms, linear or branched when possible, or cycloalkyl, optionally containing heteroatoms and/or chlorine atoms, the heteroatoms selected from the group consisting of O and N, $R_2$ optionally contains one or more functional groups selected from OH, COOH, epoxide, ester and ether, $R_2$ optionally contains double bonds, or $R_2$ is H, n is an integer in the range 0–10, $R_2$ is of alkyl type from 1 to 10 carbon atoms containing functional groups of hydroxide type, n is an integer in the range 0–5.

12. A composition according to claim 11, wherein the monomers of formula (I) are ethylacrylate, n-butylacrylate, acrylic acid, hydroxyethylacrylate, hydroxypropylacrylate, (hydroxy)ethylhexylacrylate.

13. A composition accordingly to claim 1, wherein ECTFE has a Melt Flow Index (MFI) higher than 5 g/10', measured at 275° and at 2.16 Kg load (according to the ASTM 3275-89 method).

14. A process for the preparation of the composition according to claim 1 by radical polymerization of the ECTFE or ETFE (co)polymer (B) in the presence of the PCTFE (co) polymer (A), or by the radical polymerization of the PCTFE (co)polymer (A) in the presence of the ECTFE or ETFE (co)polymer (B).

15. A process according to claim 14, wherein the (co) polymerization is carried out in suspension in organic medium or in aqueous emulsion, at a temperature between −60° and 150° C., and at a reaction pressure in the range 0.5–100 bar.

16. A process according to claim 14, wherein the (co) polymerization is carried out in the presence of radical initiators selected from:

(i) bis-acylperoxides of formula $(R_f-CO-O)_2$, wherein $R_f$ is a (per)haloalkyl $C_1-C_{10}$ or a perfluoropolyoxyalkylene group;
(ii) dialkylperoxides of formula $(R_H-O)_2$, wherein RH is an alkyl $C_1-C_{10}$;
(iii) inorganic peroxides soluble in water;
(iv) dialkylperoxydicarbonates, wherein the alkyl has from 1 to 8 carbon atoms;
(v) organic or inorganic redox systems;
(vi) photoinitiators activated by UV radiation.

17. A process according to claim 16, wherein the radical initiators are selected from:
bis-trichloroacetylperoxide, bis-dichlorofluoroacetylperoxide; diterbutylperoxide (DTBP); sodium and potassium persulphate; di-n-propyl-peroxydicarbonate, di-isopropyl-peroxydicarbonate; ammonium persulphate/sodium sulphite, hydrogen peroxide/aminoiminomethansulphinic acid, terbutylhydroperoxide/methabisulphite; inorganic and organic peroxides, halogenated and polyhalogenated organic compounds.

18. A process according to claim 14, wherein in the (co)polymerization in suspension, the reaction medium is formed by water and of an organic phase constituted by the monomers themselves, or by the monomers dissolved in an organic solvent selected from branched chain hydrocarbons having from 6 to 25 carbon atoms and a ratio between methyl groups and number of carbon atoms higher than 0.5, chlorofluorocarbons, (per) fluoropolyethers with at least a hydrogenated end group of the $-CF_2H$, $-CF_2CF_2H$, $-CF(CF_3)H$ type.

19. A process according to claim 14, wherein the (co) polymerization is carried out in aqueous emulsion in the presence of one or more fluorinated surfactants.

20. A process according to claim 19 in the presence of dispersions, emulsions or microemulsions.

21. A process according to claim 14, wherein during the ECTFE or ETFE synthesis chain transfer agents are used.

22. A process according to claim 21, wherein the chain transfer agents are selected from chloroform and methylcyclopentane.

23. A process according to claim 14, wherein both (co) polymers, first the PCTFE and then ECTFE or ETFE, or first ECTFE or ETFE and then PCTFE, are synthesized in sequence in the same reaction medium, both in suspension or in emulsion.

24. A process according to claim 14, wherein the ECTFE or ETFE copolymer (B) synthesis takes place in organic suspension in presence of water and of a PCTFE (co) polymer (A).

25. A process according to claim 24, characterized in that the PCTFE is added under the form of powder or latex and in the presence of a coagulant of PCTFE.

26. A process according to claim 25, wherein the coagulant is selected from aluminum sulphate, nitric acid, hydrochloric acid, calcium chloride.

27. A process according to claim 26, wherein the coagulant is calcium chloride.

28. A process according to claim 24, wherein the PCTFE under the form of latex is added at the beginning and/or during the (co)polymer (B) synthesis.

29. The process according to claim 20 wherein the microemulsions comprise perfluoropolyoxyalkylenes, or fluoropolyoxyalkylenes having hydrogenated end groups and/or hydrogenated repeating units.

* * * * *